United States Patent [19]

Matsunata

[11] Patent Number: 4,603,487
[45] Date of Patent: Aug. 5, 1986

[54] METHOD OF COMPENSATING A PROFILING DIRECTION OF A PROFILING MACHINE

[75] Inventor: Yuso Matsunata, Hiroshima, Japan

[73] Assignee: Mitsubishi Jukogyo Kabushiki Kaisha, Japan

[21] Appl. No.: 801,050

[22] Filed: Nov. 22, 1985

[51] Int. Cl.⁴ .............................................. G01B 7/28
[52] U.S. Cl. ....................................... 33/551; 33/503; 33/555; 33/556; 33/179.5 D
[58] Field of Search ................ 33/551, 553, 555, 556, 33/503, 504, 505, 179.5 R, 179.5 D

[56] References Cited

U.S. PATENT DOCUMENTS

| | | | |
|---|---|---|---|
| 3,481,043 | 12/1969 | Esch | 33/556 |
| 3,795,054 | 3/1974 | Kinney | 33/505 |
| 3,840,994 | 10/1974 | Izumi et al. | 33/503 |
| 4,118,871 | 10/1978 | Kirkham | 33/504 |
| 4,333,238 | 6/1982 | McMurtry | 33/503 |
| 4,402,051 | 8/1983 | Nozawa et al. | 33/504 |
| 4,472,782 | 9/1984 | Suzuki | 33/505 |

*Primary Examiner*—Willis Little
*Attorney, Agent, or Firm*—Toren, McGeady, Stanger, Goldberg & Kiel

[57] ABSTRACT

A method for compensating a profiling direction of a profiling machine which is constructed to effect the surface profiling in any angular direction includes calculating a distance or a deviation quantity between an ideal profiling locus defined from a given profiling angle and an actual machine position and adding a correction angle proportional to the deviation quantity to the given profiling angle to obtain a new profiling angle so that the new profiling angle is used to correct an angle to attain the profiling operation.

3 Claims, 4 Drawing Figures

METHOD OF COMPENSATING A PROFILING DIRECTION OF A PROFILING MACHINE

INDUSTRIAL FIELD OF UTILZATION

The present invention relates to an effective method of compensating a profiling direction of a profiling machine which carries out the surface profiling operation in any given angular direction.

PRIOR ART

In a prior art surface profiling operation of a profiling machine, it is common that the profiling operation can not be made except a direction parallel to a moving axis of the machine as a rule. Accordingly, it is inconvenient that the direction of an original model being profiled to the machine must be changed depending on the model to set the model in a position suitable for profiling. Exceptionally, while there has been developed a profiling machine which is constructed to profile in the direction of 45° to a moving axis of the machine, the machine has a defect described later.

It is strongly desired to be able to freely change the profiling direction in accordance with a shape of the original model without changing the direction of the model to the profiling machine so that any angular direction can be selected to attain the profiling operation with high accuracy.

In order to satisfy the desire, a velocity in the moving direction of the profiling machine may be previously distributed in two axial directions so that the direction of the resultant velocity in the two axial directions coincides with a given angular direction theoretically. However, there is a large problem that the actual machine position is deviated from an ideal profiling locus due to the influences such as an arithmetic error produced when the profiling velocity is obtained, an electrical offset signal latent within a servo system and the like.

The above function in the prior art profiling machine constructed to profile in the direction of 45° does not solve the above problem and the machine is merely put to practical use when the profiling operation for a surface is made in one direction and a profiling path is short in distance. It is disadvantageous that a pick feed interval is varied widely in the case of the surface reciprocating profiling.

PROBLEMS THAT THE INVENTION IS TO SOLVE

As described above, a practical manner in which the profiling operation can be exactly made in a any given direction is desired but there is no effective manner heretofore.

It is an object of the present invention to provide a method in which the profiling operation can be always made exactly by correcting the deviation of an actual profiling direction from a given angular direction.

MEANS OF SOLVING THE PROBLEMS

In order to achieve the above object, the profiling direction compensating method of the present invention is featured in that a distance or a deviation quantity between an ideal profiling locus defined from a given profiling angle and an actual machine position in a profiling machine which is constructed to effect the surface profiling in any angular direction is calculated and a profiling angle added a correction angle proportional to the deviation quantity to the given profiling angle is obtained so that the added profiling angle is used to correct an angle to attain the profiling operation.

DESCRIPTION OF THE PREFERRED EMBODIMENT

An embodiment of the present invention is now described with reference to the drawings.

Figure 1:
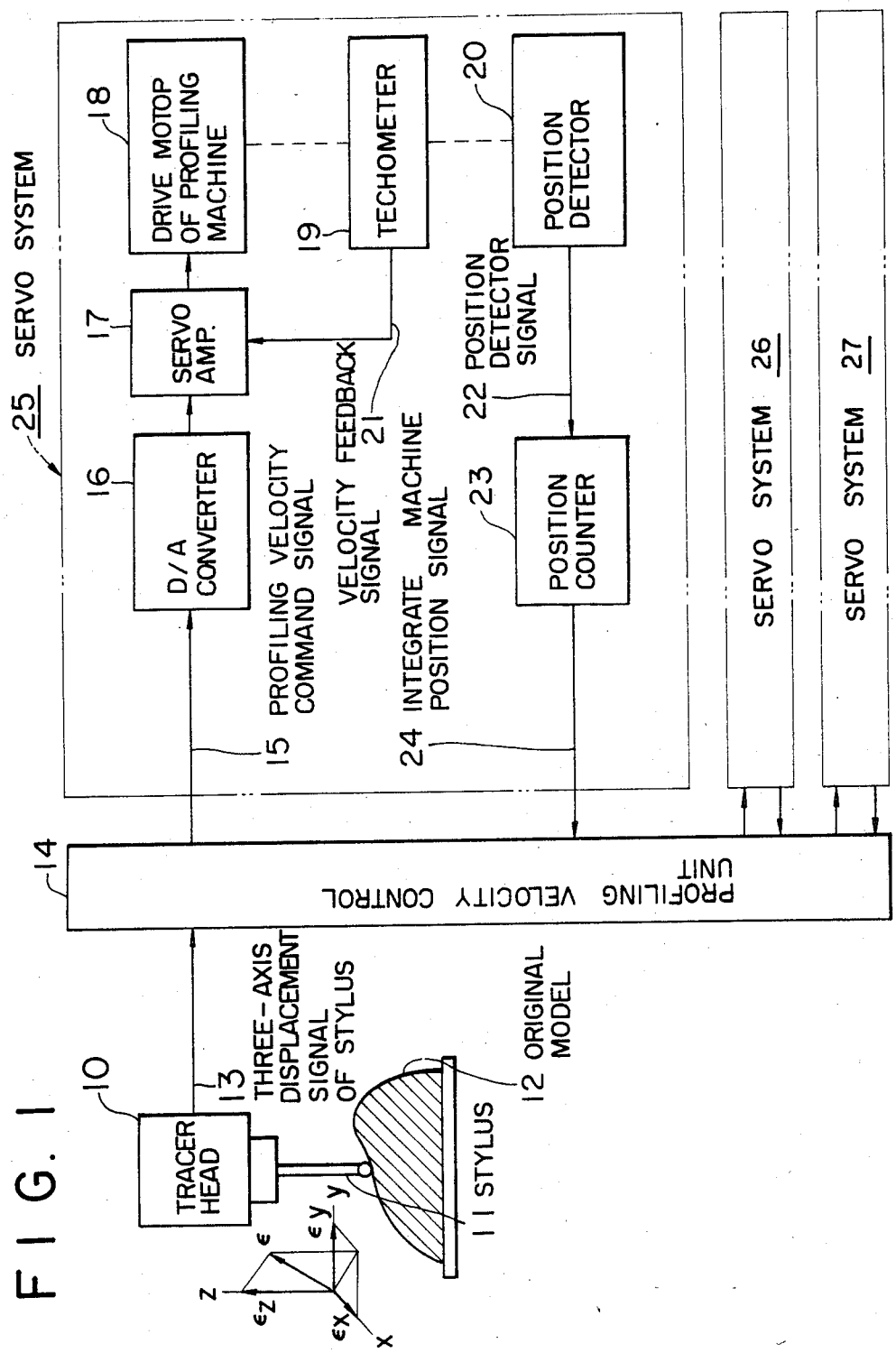
FIG. 1 is a block diagram showing an embodiment of the present invention.

A profiling machine itself is constructed to make the surface profiling operation in any direction. In FIG. 1, numeral 10 denotes a tracer head, 11 a stylus of a profile tracer, 12 an original model being profiled, 13 a three-axis displacement signal of the stylus 11, 14 a profiling velocity contol unit, 25, 26 and 27 servo systems for each axis, 15 a profiling velocity command signal, 16 a digital-to-analog (D/A) converter, 17 a servo amplifier, 18 a drive motor for the profiling machine, 19 a tachometer, 20 a position detector, 21 a velocity feedback signal, 22 a position detection signal, 23 a position counter and 24 a signal of integrated position of the machine.

Although FIG. 1 shows in detail the elements 15 to 24 in the servo system 25 concerning to a certain axis, for example an axis x of the profiling machine, the other servo systems 26 and 27 concerning other axes, for example axes y and z, are also constructed in the same manner but are simplified.

The profiling velocity control unit 14 is supplied with the stylus displacement signal 13 and supplies the profiling velocity command signal 15 forming an operation signal to the servo systems to control the three axes of the profiling machine so that the stylus 11 can trace the surface of the model 12 exactly. More particularly, the drive motors 18 for each axis of the profiling machine are supplied with the profiling velocity command signals 15 corresponding to the respective axes so that an absolute value of the normal vector of the model shape obtained from the displacements $\epsilon_x$, $\epsilon_y$ and $\epsilon_z$ of the three axes X, Y and Z of the stylus 11 and shown in the following equation (1) is maintained to a certain constant value.

$$\epsilon = \sqrt{\epsilon_x^2 + \epsilon_y^2 + \epsilon_z^2} \tag{1}$$

In the present embodiment, the profiling velocity control unit 14 may be a microcomputer which performs a desired operation. The profiling velocity command signal 15 is converted to an analog voltage signal by the D/A converter 16 and the analog voltage signal is amplified by the servo amplifier 17 to drive the motor 18. The tachometer 19 is integrally coupled with a motor shaft. The velocity detection signal 21 produced from the tachometer 19 is fed back to the servo amplifier 17 and control is effected so that the velocity meets a command value.

The position detection signal 22 form the position detector 20 is integrated by the counter 23 and the integrated machine position signal 24 from the counter 23 representing a current position of the profiling machine is supplied to the profiling velocity control unit 14.

Figure 2:
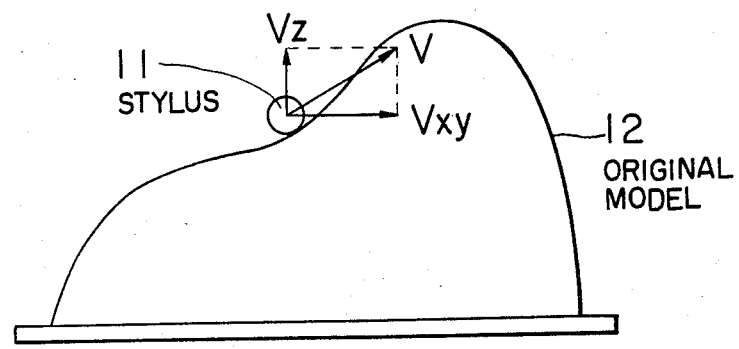
FIG. 2 illustrates a velocity distribution in the surface profiling.

As shown in FIG. 2, the velocity divided in the direction of the three axes X, Y and Z in the surface profiling operation is composed of a velocity component $v_z$ in the vertical direction Z and a velocity component $v_{xy}$ in the horizontal direction, that is, in the direction in the plane formed of the axes X and Y.

In order to profile in any direction, basically, the velocity component $v_{xy}$ is further decomposed in accordance with a given profile angle $\phi$ into two components of the axes X and Y given by $$v_x = v_{xy} \cdot \cos \phi$$
$$v_y = v_{xy} \cdot \sin \phi \quad (2)$$

This velocity components form the velocity command.

The correction control in the profiling direction is attained by calculating a correction signal in the profiling velocity control unit 14 while using the above components $v_x$, $v_y$ and $v_z$ as the velocity commands for respective axes.

Figure 3:
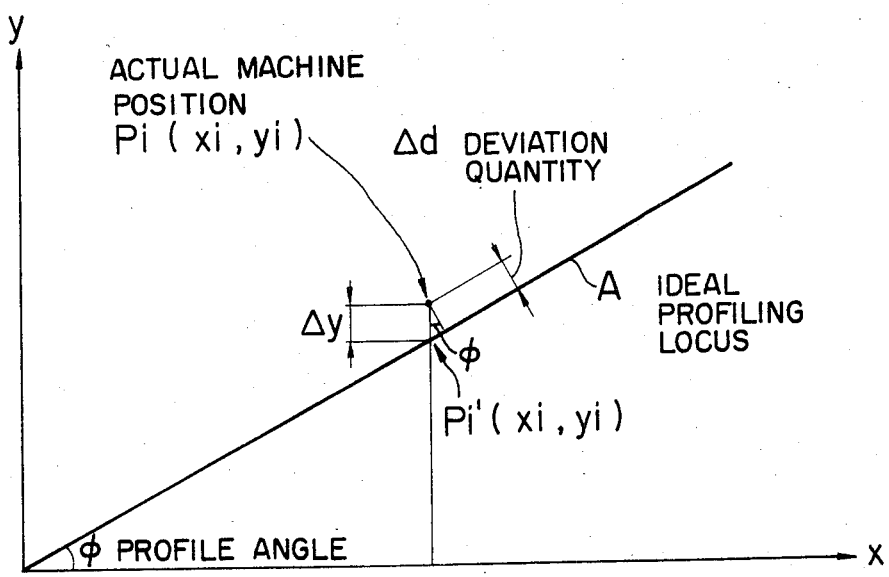
FIG. 3 is a diagram showing an operation of a deviation quantity.

In FIG. 3, $\phi$ is any profile angle and a line A represents an ideal profiling locus formed on the basis of the profile angle $\phi$. A position Pi is an actual machine position at a certain time.

The profiling velocity control unit 14 calculates a distance or deviation quantity $\Delta d$ between the machine position Pi and the straight line A of the ideal profiling locus from the inputted profile angle $\phi$ and the integrated machine position signals $x_i$ and $y_i$ on the basis of the following equations (3):

$$k = \tan \phi$$
$$\Delta y = k \cdot x_i - y_i \quad (3)$$
$$\Delta d = \Delta y \cdot \cos \phi$$

Figure 4:
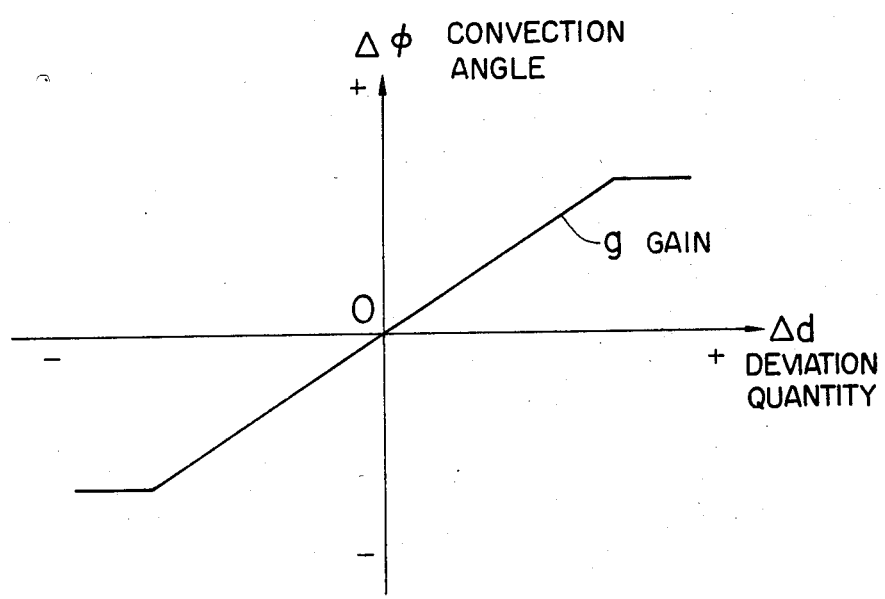
FIG. 4 is a graph showing an exemplified relation between a deviation quantity and a correction angle.

The profiling velocity control unit 14 multiplies the deviation quantity $\Delta d$ by a gain g to calculate a correction angle $\Delta \phi$ proportional to the deviation quantity $\Delta d$ (see FIG. 4). Further, the control unit 14 adds the correction angle $\Delta \phi$ to the given profile angle $\phi$ and calculates the velocity components of the axes X and Y of the velocity $v_{xy}$ in the horizontal direction (X-Y) on the basis of the following equation (4), so that the profiling velocity command signals 15 are supplied to the X-axis servo system 25 and the Y-axis servo system 26, respectively.

$$v_x = v_{xy} \cdot \cos (\phi + \Delta \phi)$$
$$v_y = v_{xy} \cdot \sin (\phi + \Delta \phi) \quad (4)$$

The deviation in the profiling direction is corrected by the new velocity command.

The correction angle $\Delta \phi$ may be a very small quantity and hence the gain g can have a limit characteristic as shown in FIG. 4. The operation in the control unit 14 can be made in an analog manner but if a microcomputer is used for digital processing, a software is used to make the above correction so that the deviation from the ideal straight line A is minimized for each sampling period.

EFFECTS OF THE INVENTION

As described above, according to the present invention, the surface profiling in any given direction is exactly attained along a target line by repeating the procedure that the ideal profiling locus and the actual machine position are collated to obtain the deviation therebetween and the profiling angle is corrected by the correction angle proportional to the deviation. Accordingly, the profiling direction correcting method of the present invention possesses the excellent effect that the profiling operation in any angular direction, which is impossible heretofore, can be put to practical use by performing a simple correction by means of the software of the microcomputer.

I claim:

1. In a method of controlling a profiling machine including:
   a tracer head capable of tracing an original model and for supplying a displacement signal detected by a stylus to a profiling velocity control unit;
   a servo system including a drive system for driving the profiling machine on the basis of a profiling velocity command signal produced from the control unit, a detector for detecting a position of the profiling machine and a machine position counter for integrating an output signal of the detector to supply the integrated signal to the control unit; and
   a control unit for calculating the profiling velocity command signal on the basis of the displacement signals for three axes and an output of the counter to supply the command signal to the drive system;
   a method of correcting a profiling direction of the profiling machine, comprising steps of:
   calculating a distance between a current position of the machine obtained by tracing the model in a plane of axes x and y and an ideal profiling locus in the plane of axes x and y defined by a given profile angle;
   calculating a correction quantity in a moving direction of the profiling machine in the plane of axes x and y on the basis of the distance; and
   supplying a velocity command signal on the basis of a corrected moving direction to the servo system from the control unit.

2. A method according to claim 1, wherein said step of calculating the correction quantity comprises a step of obtaining velocity components $v_x$ and $v_y$ in accordance with the following equations when the given profile angle is an angle $\phi$ with regard to the axis x in the plane of axes x and y and the profiling velocity in the plane of axes x and y is $v_{xy}$ $$v_x = v_{xy} \cdot \cos (\phi + \Delta \phi)$$
$$v_y = v_{xy} \cdot \sin (\phi + \Delta \phi)$$

where
   $\Delta \phi = g \Delta d$
   g: gain (proportional constant)
   $\Delta d = \Delta y \cdot \cos \phi$
   $\Delta y = k \cdot x_i - y_i$
   $k = \tan \phi$
   $x_i$: an integrated value in axis x of an output of the detector
   $y_i$: an integrated value in axis y of an output of the detector.

3. A method according to claim 2, wherein said gain g includes a saturation characteristic (limit characteristic) for $\Delta d$.

* * * * *

UNITED STATES PATENT AND TRADEMARK OFFICE
CERTIFICATE OF CORRECTION

PATENT NO. : 4,603,487

DATED : August 5, 1986

INVENTOR(S) : Yuso Matsunaga

It is certified that error appears in the above-identified patent and that said Letters Patent is hereby corrected as shown below:

Title page:

[75] Yuso Matsunaga, Hiroshima, Japan

Signed and Sealed this

Tenth Day of February, 1987

Attest:

DONALD J. QUIGG

Attesting Officer

Commissioner of Patents and Trademarks